United States Patent
Harriman et al.

(10) Patent No.: US 8,612,060 B2
(45) Date of Patent: Dec. 17, 2013

(54) POWER ALLOCATION CONTROLLER (75) Inventors: David J. Harriman, Portland, OR (US); Robert A. Dunstan, Forest Grove, OR (US); Abdul R. Ismail, Beaverton, RI (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 12/890,439

(22) Filed: Sep. 24, 2010

(65) Prior Publication Data

US 2012/0078690 A1 Mar. 29, 2012

(51) Int. Cl.
*G06F 1/26* (2006.01)
*H02J 1/00* (2006.01)

(52) U.S. Cl.
USPC ............ 700/295; 713/300; 713/320

(58) Field of Classification Search
USPC ........... 700/286, 291, 293, 295; 713/313, 713/320–324, 300; 375/E7.019
See application file for complete search history.

(56) References Cited

U.S. PATENT DOCUMENTS

| | | | |
|---|---|---|---|
| 5,483,656 A * | 1/1996 | Oprescu et al. | 713/320 |
| 5,560,022 A * | 9/1996 | Dunstan et al. | 713/300 |
| 7,631,201 B2 * | 12/2009 | Hansalia | 713/300 |
| 7,774,628 B2 * | 8/2010 | Hansalia | 713/320 |
| 7,886,165 B2 * | 2/2011 | Khan et al. | 713/300 |
| 8,082,459 B2 * | 12/2011 | Araujo, Jr. | 713/323 |
| 8,205,102 B2 * | 6/2012 | Kabbara et al. | 713/300 |
| 8,219,839 B2 * | 7/2012 | Akimoto | 713/320 |
| 8,266,456 B2 * | 9/2012 | Chang et al. | 713/300 |
| 2006/0212724 A1 | 9/2006 | Dwelley et al. | |
| 2007/0136614 A1 | 6/2007 | Heath et al. | |
| 2009/0164805 A1 | 6/2009 | Diab et al. | |
| 2009/0217065 A1 * | 8/2009 | Araujo, Jr. | 713/320 |
| 2010/0171602 A1 | 7/2010 | Kabbara et al. | |
| 2012/0151240 A1 * | 6/2012 | Robinson et al. | 713/340 |

FOREIGN PATENT DOCUMENTS

WO 2012040678 A2 3/2012
WO 2012/040678 A3 7/2012

OTHER PUBLICATIONS

International Search Report and Written Opinion received for PCT Application Serial No. PCT/US2011/053169, mailed Mar. 21, 2012, 9 pages.
International Preliminary Report on Patentability and Written Opinion received for PCT Patent Application No. PCT/US2011/053169, mailed on Apr. 4, 2013, 6 pages.

* cited by examiner

*Primary Examiner* — Dave Robertson
(74) *Attorney, Agent, or Firm* — Jordan IP Law, LLC (57) ABSTRACT

Methods and systems may include an apparatus having a power line interface and a controller with management logic. The management logic can manage the power delivery policies of devices connected to the power line interface based on changes in the power delivery capability of the apparatus.

21 Claims, 6 Drawing Sheets

POWER ALLOCATION CONTROLLER

BACKGROUND

1. Technical Field

Embodiments generally relate to platform power management. More particularly, embodiments relate to the management of power delivery policies between platforms and devices that communicate with one another over one or more busses.

2. Discussion

Conventional peripheral busses such as USB (Universal Serial Bus) and IEEE (Institute of Electrical and Electronics Engineers) 1394 busses may deliver power from platforms to connected devices in a constrained way, without consideration for or use of a platform-level power delivery/consumption policy. Rather, power might be provisioned by either ensuring that the platform's source can supply a specified maximum for all bus ports, or by making assumptions as to user activity coupled with a reliance on over-current protection mechanisms to prevent overloads. Simply put, such a lack of a full and accurate picture of the platform's ability—which can be dynamic—to supply power to peripheral busses may cause platforms to be over provisioned, leading to increased cost, or under provisioned, leading to a poor user experience. Indeed, under provisioning could result in an inability to power devices, or even platform malfunction.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for an apparatus having a power line interface and a controller. The controller can include management logic to manage a power delivery policy of a first device connected to the power line interface based on a change in a power delivery capability of the apparatus.

Embodiments can also include a system having a processor and an input/output (IO) module. The IO module may have a power line interface and a controller with management logic, wherein the management logic can manage a power delivery policy of a first device connected to the power line interface based on a change in a power delivery capability of the system.

Other embodiments may provide for a method in which a power delivery capability may be determined for a system having a power line interface. A connection of a first device to the power line interface can be detected, and a first power delivery policy may be negotiated with the first device, wherein the negotiating is conducted over a first power line coupled to the power line interface. The method may also provide for updating the power delivery capability of the system based on the first power delivery policy. If a connection of a second device to the power line interface is detected, the method may involve negotiating a second power delivery policy with the second device over a second power line coupled to the power line interface. The power delivery capability of the system can also be updated based on the second power delivery policy, wherein the first and second power delivery policies each may indicate a direction of power delivery.

Figure 1:
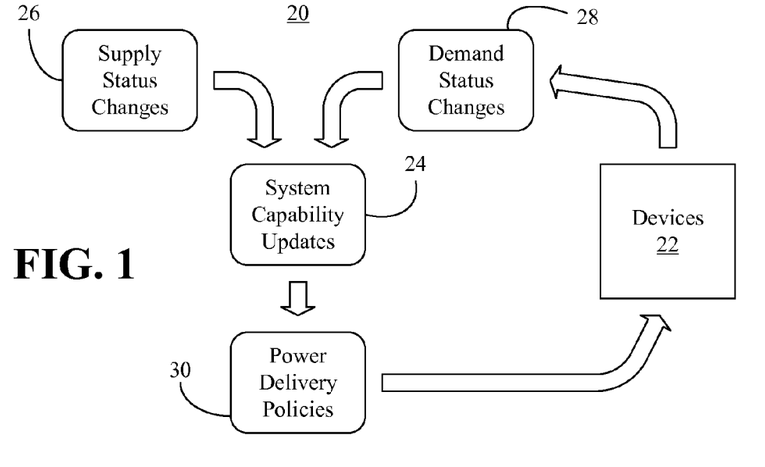
FIG. 1 is a block diagram of an example of a scheme of managing power delivery policies according to an embodiment.

Turning now to FIG. 1, a scheme 20 of managing power delivery between a platform/system and one or more devices 22 is shown. Generally, system power delivery capability updates 24 may be made based on power supply status changes 26 as well as power demand status changes 28, wherein the power delivery capability updates 24 can dynamically track and manage the capacity of a power resource pool of the system. As will be discussed in greater detail, the supply status changes 26 might result from a switch from an AC (alternating current) adaptor to a battery, a switch from a battery to an AC adaptor, removal of a battery, change in operating state, etc. For example, a desktop might be able to supply tens of watts when in the normal operational state (e.g., S0 state), but may only be able to supply around a single watt when in the suspended or off state (e.g., S3-S5 state). Similarly, a notebook may be able to supply tens of watts when connected to an AC adaptor, but only a few watts when operating from a battery.

The demand status changes 28 could be associated with connections and disconnections of the devices 22 from one or more busses of the system, wherein connecting devices 22 may increase the power demand on the system and disconnecting devices 22 may free up additional power resources. Demand status changes 28 could also result from internal system events such as changes in application processing requirements. Thus, even when the ability to supply power is a relative constant, the aggregate load presented by multiple devices may exceed a system's ability to power a new addition. Accordingly, the illustrated scheme 20 provides for updating the power delivery policies 30 of the devices 22 based on the system capability updates 24. The policies might be hard coded, established at configuration time (e.g., loaded from basic input output system/BIOS), loaded at run time (e.g., driven by an operating system/OS power policy manager), or any combination thereof. Managing (e.g., rebalancing) the power delivery policies 30 at the system level based on dynamically changing system power delivery capabilities can enable enhanced system design and performance.

Figure 2:
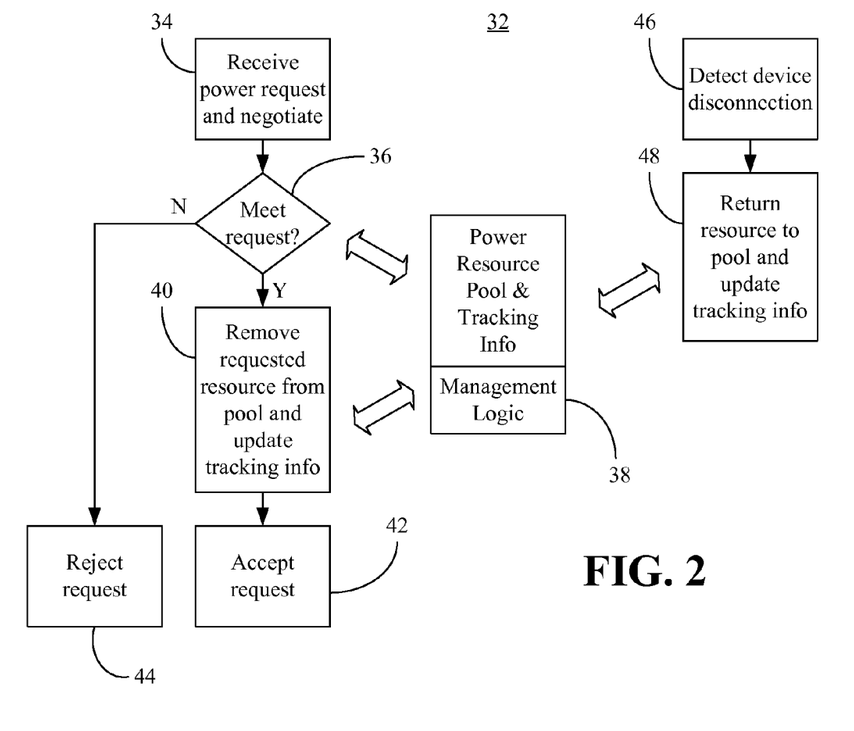
FIG. 2 is a flow diagram of an example of a method of managing power demand status changes according to an embodiment.

FIG. 2 shows a method 32 of using management logic 38 and tracking information to manage power demand status changes in a platform having a power resource pool. The method 32 may be implemented in fixed-functionality hardware using circuit technology such as application specific integrated circuit (ASIC), complementary metal oxide semiconductor (CMOS) or transistor-transistor logic (TTL) technology, in executable code as a set of logic instructions stored in a machine- or computer-readable medium of a memory such as random access memory (RAM), read only memory (ROM), programmable ROM (PROM), flash memory, etc., or any combination thereof.

Processing block 34 provides for receiving a power request from a device and negotiating a power delivery policy with the device based on the request. As will be discussed in greater detail, the negotiation can be conducted over a power line connection between the platform and the device, and may even involve a determination of the power delivery direction (e.g., platform-to-device, or device-to-platform). Alternatively, the negotiation may be conducted over a data line connection between the platform and the device, or even another connection used for negotiation or other purposes. Moreover, the negotiation can occur concurrently with the transfer of data between the platform and the device. If it is determined at block 36 that the request can be met, the requested power delivery resource can be removed from the power delivery pool at block 40. The tracking information may also be updated, wherein block 42 provides for accepting the request. If the request cannot be met, illustrated block 44 provides for rejecting the request. If a device disconnection is detected at block 46, block 48 may return the power resource associated with the disconnected device to the resource pool and update the tracking information accordingly. Thus, in the illustrated approach, power resources can be dynamically managed at the platform level as changes take place in the status of the power demand on the platform. Moreover, power resources can be managed as changes take place in capability and based on whether the platform is providing or receiving power, as discussed in greater detail below.

Figure 3:
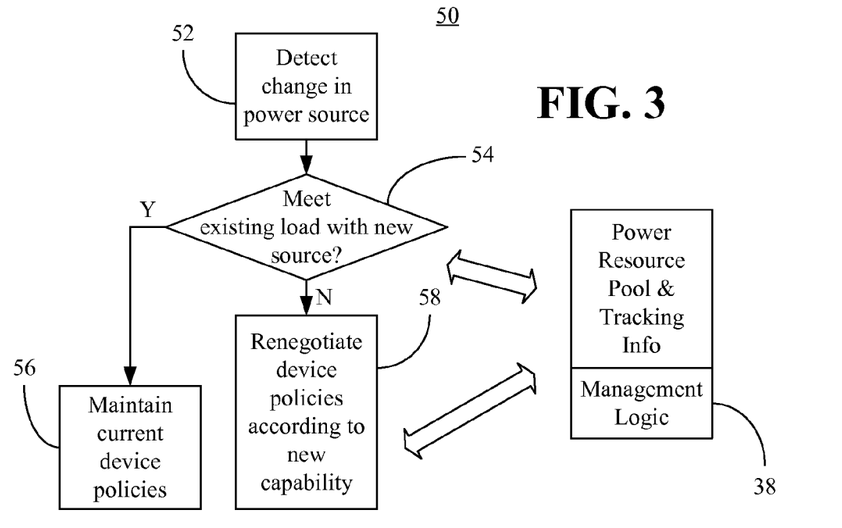
FIG. 3 is a flow diagram of an example of a method of managing power supply status changes according to an embodiment.

Turning now to FIG. 3, a method 50 of using management logic 38 and tracking information to manage power supply status changes in a platform having a power resource pool is shown. In illustrated block 52, a change in a power source (e.g., switch from AC to battery power) of the platform is detected, wherein a determination may be made at block 54 as to whether the existing load on the platform can be met with the new power source. If so, the present power delivery policies may be maintained at block 56. If the load requirement (e.g., volts, amps, both volts and amps, etc.) exceeds the new power delivery capability of the platform the device power delivery policies may be renegotiated at block 58 according to the new power delivery capability. As will be discussed in greater detail, the negotiation can involve modifying the power delivery policy of one or more devices connected to the platform so that the load requirement of the connected devices no longer exceeds the power delivery capability of the apparatus. Indeed, in the case where the power source of the platform is removed altogether, the negotiation at block 58 might include a change in the power delivery direction between the platform and the device if the device is able supply power to the platform (e.g., "producer").

Figure 4:
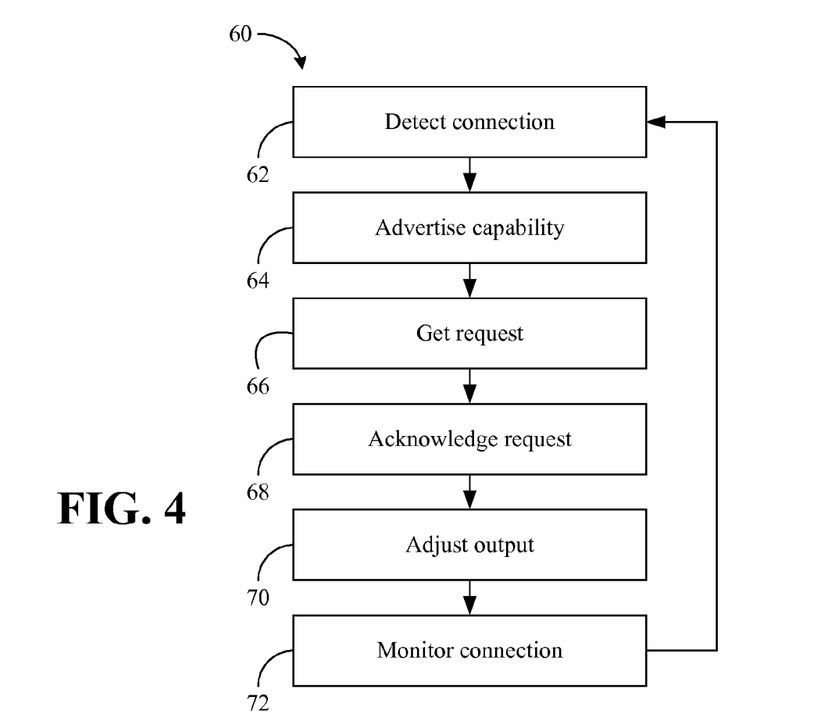
FIG. 4 is a flow diagram of an example of a method of negotiating a power delivery policy with a connected device according to an embodiment.

FIG. 4 shows a method 60 of negotiating a power delivery policy between a platform and a connected device. The method 60 could be implemented as power management logic in either the platform or the device, or both. Illustrated block 62 provides for detecting the connection between the platform and the device. The connection can involve a power line (e.g., $V_{bus}$ line) of a bus, wherein the bus may also include data lines. The power delivery capability of the apparatus detecting the connection can be advertised at block 64 over the power line, wherein block 66 provides for receiving a power delivery request from the device/platform connected to the power line. If the request can be met by the apparatus, an acknowledgement may be transmitted over the power line at block 68 and the output associated with the power line can be adjusted at block 70 based on the request. Illustrated block 72 provides for monitoring the connection for disconnections, requests, advertisements, etc. Alternatively, the negotiation might involve receiving an advertisement over a power line, wherein the advertisement identifies a power delivery requirement, and sending acknowledgement of the advertisement over the power line.

Figure 5:
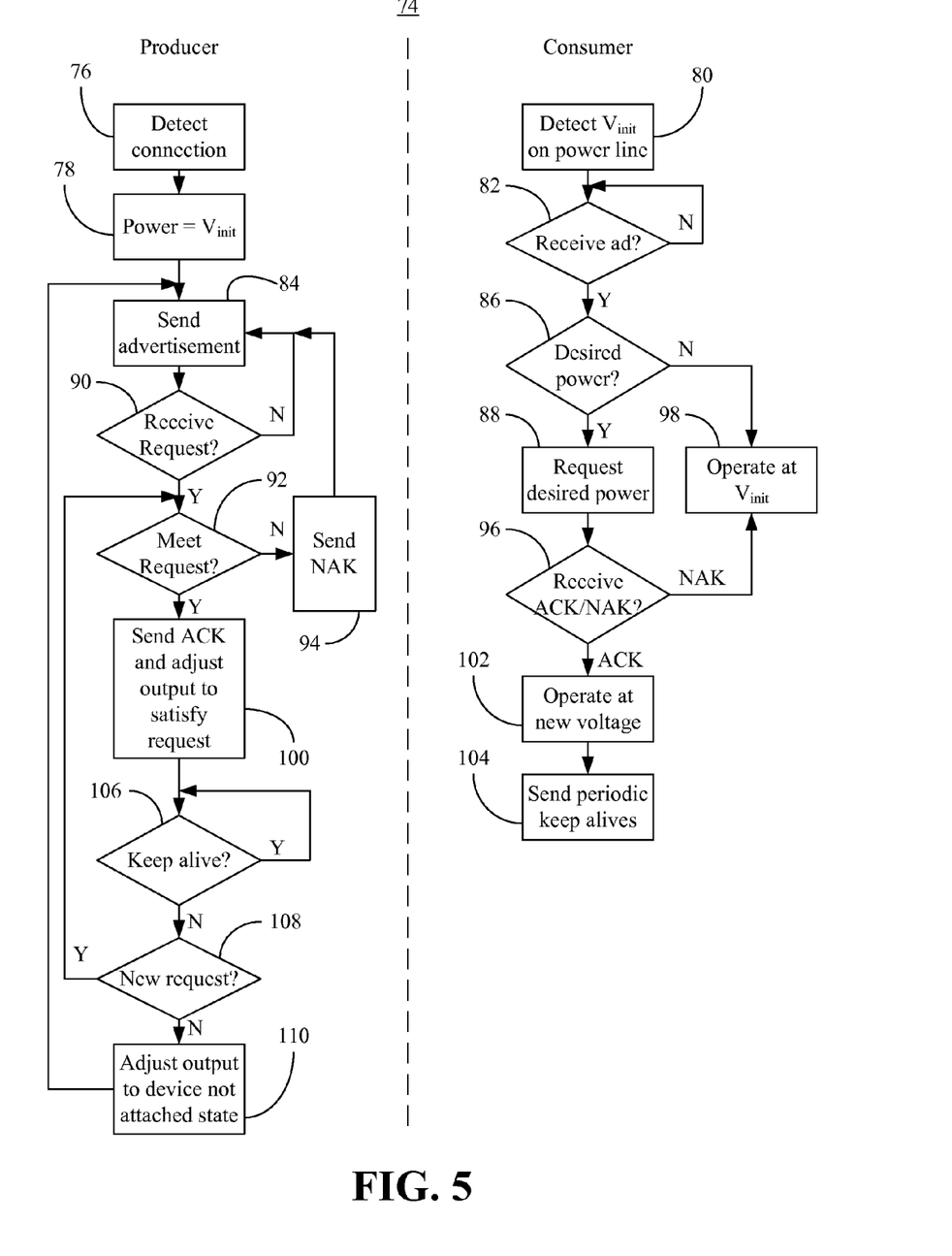
FIG. 5 is a flow diagram of an example of a method of negotiating a power delivery policy between a producer and a consumer according to an embodiment.

Turning now to FIG. 5, a more detailed example of a negotiation between a producer and a consumer over a power line is shown at method 74. In the illustrated example, a connection of a consumer to a power line interface of a producer is detected at producer block 76. In response to detecting the connection, the producer can adjust the output associated with the power line in question to an initial voltage ($V_{init}$) level at producer block 78. When the illustrated consumer detects the initial voltage at consumer block 80, a determination is made at consumer block 82 as to whether an advertisement has been received from the producer over the power line. Producer block 84 provides for sending an advertisement of the producer's power delivery capability from the producer to the consumer over the power line connecting the two apparatuses.

For example, the advertisement might identify an operating voltage level that is greater than the initial voltage level. Upon detection of the advertisement, consumer block 86 may determine whether the advertised power delivery capability is desired. The determination at block 86 can be based on the operating characteristics of the consumer within the constraints of what the producer has advertised. For example, if the consumer has a relatively high load requirement due to a processing demand on an internal processor of the consumer and the consumer has limited internal power delivery capability (e.g., low battery level), the consumer might have a significant need for power delivery from the source. In such a case, consumer block 88 may provide for requesting the desired power from the producer.

If it is determined at producer block 90 that the consumer has requested some or all of the advertised power delivery capability, illustrated producer block 92 may determine whether the request can be met. Block 92 might enable the producer to account for changes in its power delivery capability due to, for instance, supply status changes 26 (FIG. 1) or demand status changes 28 (FIG. 1) that may have occurred since the transmission of the advertisement at producer block 84. If the request cannot be met, illustrated producer block 94 sends an acknowledgement denial (NAK) to the consumer. If it is determined that either an acknowledgement denial has been received at consumer block 96, or the advertised power is not desired at consumer block 86, the consumer may be operated at the initial voltage (and current) at consumer block 98.

If the producer can meet the request, illustrated producer block 100 provides for sending an acknowledgement (ACK) to the consumer and adjusting the output to satisfy the request. Accordingly, illustrated consumer block 102 provides for operating the consumer at the new voltage level. Periodic keep alive messages ("keep alives") may be sent to the producer at consumer block 104, wherein producer block 106 provides for determining whether the keep alives continue to be transmitted. If not, producer block 108 can provide for determining whether a new request has been received. If a new request has been received, the illustrated producer determines whether the request can be met. Otherwise, producer block 110 provides for adjusting the output associated to the device not attached state, and updating the power delivery capability of the producer accordingly.

Figure 6:
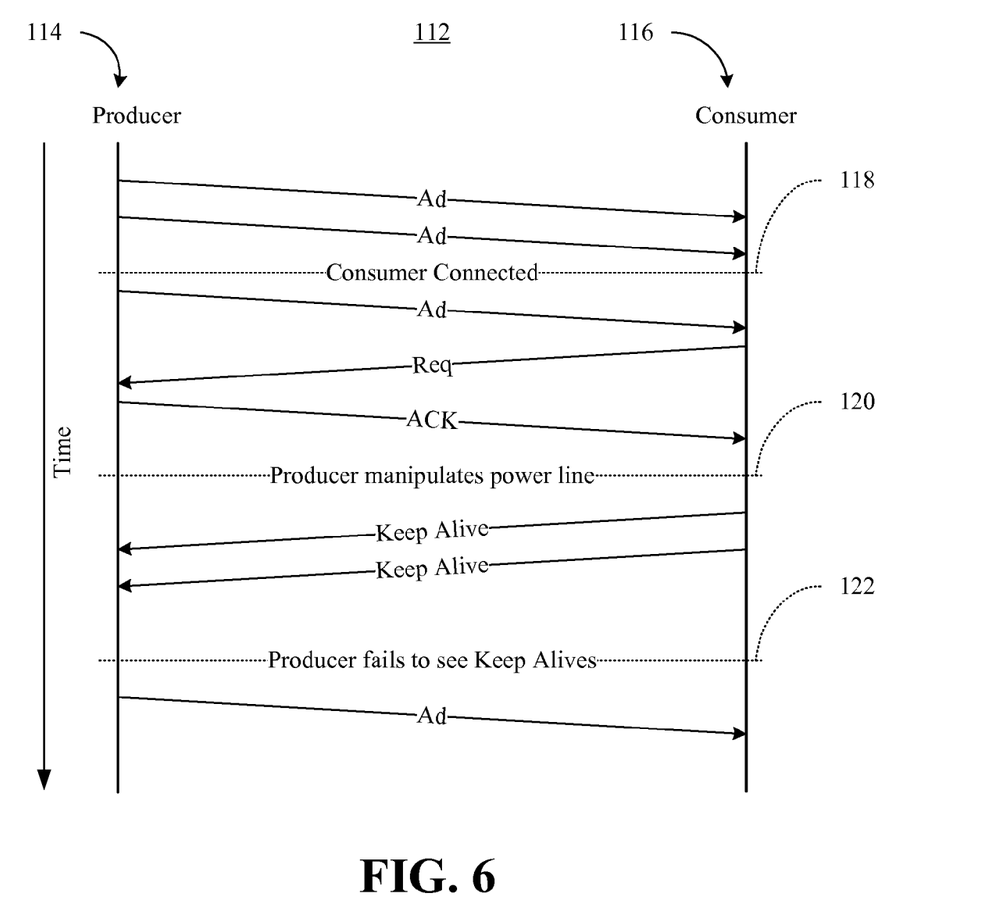
FIG. 6 is a timing diagram of an example of a power delivery negotiation between a producer and a consumer according to an embodiment.

FIG. 6 shows a timing diagram 112 for a power delivery negotiation between a producer 114 and a consumer 116 over a power line connecting the two apparatuses. In the illustrated example, the producer periodically transmits an advertisement ("Ad") to a power line interface of the producer. In another embodiment, the attachment may be detected using another method and the producer could begin sending the Ad only after the attachment is detected. The choice of which approach to use could be driven by the energy cost of the alternatives. At instance 118, the consumer is connected to the power line interface of the producer, and thereafter responds to an advertisement with a request ("Req"). In the illustrated example, the producer determines that it can meet the request and sends an acknowledgement ("ACK") to the consumer. At instance 120, the producer adjusts the voltage output associated with the power line interface connected to the consumer, and the illustrated consumer begins to send periodic keep alive messages ("Keep Alive") to the producer. At instance 122, the producer fails to detect the keep alives, and begins to transmit advertisements over the power line.

Figure 7:
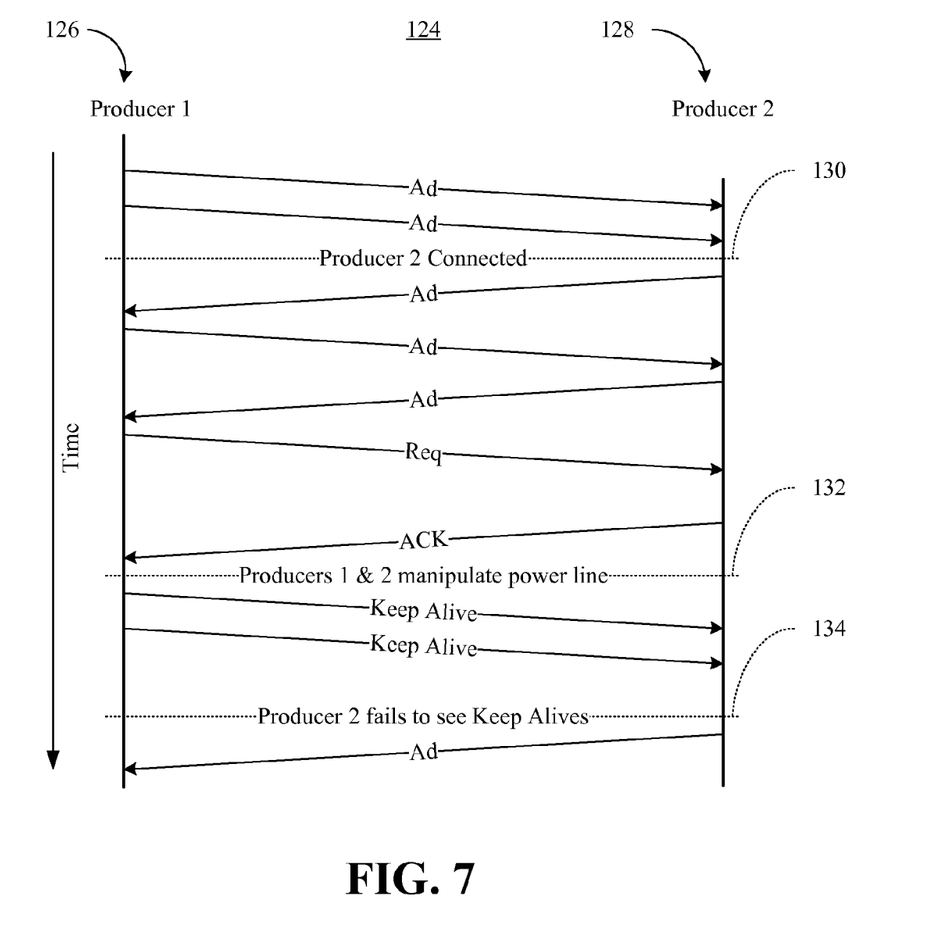
FIG. 7 is a timing diagram of an example of a power delivery negotiation between a producer and a producer according to an embodiment.

Turning now to FIG. 7, a timing diagram 124 for a power delivery negotiation between a first producer ("Producer 1") 126 and a second producer ("Producer 2") 128 over a power line connecting the two apparatuses. Thus, each producer in this case could be a producer/consumer or just a producer. In the illustrated example, the first producer 126 transmits advertisements to a power line interface of the first producer 126. At instance 130, the second producer 128 is connected to the power line interface of the first producer 126, and also begins to transmit advertisements to the power line interface of the second producer 128. The illustrated first producer 126 responds to one of the advertisements of the second producer 128 with a request, which is acknowledged by the second producer 128. At instance 132 both the first and second producers 126, 128 manipulate the power line (i.e., second producer powers the line and first producer accepts power, in essence taking on the role of a consumer) in accordance with the agreed upon power delivery policy, and the first producer 126 begins to send periodic keep alives. At instance 134, the second producer 128 fails to detect the periodic keep alives and sends another advertisement to the power line interface of the second producer 128.

Figure 8:
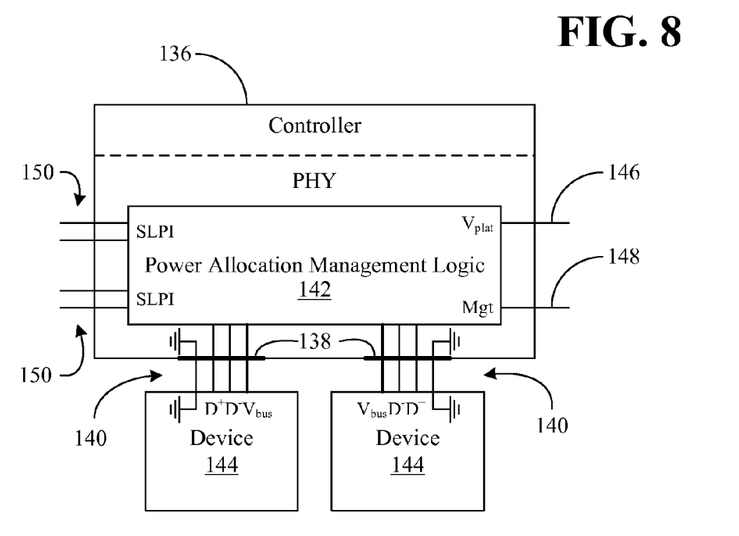
FIG. 8 is a block diagram of an example of a controller according to an embodiment.

FIG. 8 shows an apparatus with a controller 136 and one or more interfaces 138 to one or more interconnects (e.g., busses) 140. Each interconnect 140 includes a power line (e.g., $V_{bus}$) and may also include one or more data lines (e.g., D+/D−). As already noted, power delivery policies may be negotiated over the power lines, the data lines, or even another connection (not shown) used for negotiation or other purposes. Moreover, the negotiations can occur concurrently with the transfer of data between the platform and the device on the data lines. The interconnects 140 could support communications in compliance with one or more serial bus protocols (e.g., Universal Serial Bus/USB Specification, Rev. 2.0, Apr. 27, 2000; USB 3.0 Specification, Rev. 1.0, Nov. 12, 2008; Institute of Electrical and Electronics Engineers/IEEE 1394 Standard for a High-Performance Serial Bus—Amendment 3, 1394c-2006, etc.). The illustrated controller 136 has a physical layer (PHY) with power allocation management logic 142 that is configured to manage power delivery policies of devices 144 connected to the interfaces 138 based on changes in the power delivery capability of the apparatus containing the controller 136. As already noted, the power delivery capability could be dependent upon the status of the power supply as well as the status of the power demand, which in turn may be dependent upon the policies established for the devices 144.

The illustrated management logic 142 uses a platform bus voltage input ("$V_{plat}$") input and a power manageability ("Mgt") interface 148, to determine and update the power delivery capability of the platform. In addition, the management logic 142 may include one or more serial link-PHY interface (SLPI) channels 150, which can be used to pass packet data between the PHY and link layers. Integrating the management logic 142 into the otherwise unrelated PHY can enable common process technology requirements (e.g., board routing) to be leveraged across both components and may lead to a lower cost solution. Moreover, the management logic 142 may be used for a single interface port (e.g., on a handheld device), multiple ports of the same type (e.g., USB ports on a notebook), and multiple ports of varying types (e.g., system with both USB and optical bus interconnect). The management logic 142 may also be used for devices that are built into the platform via an internal connector (e.g., PC card slot) or a permanent connection. In any event, the management of power can be independent of the serial bus (e.g., USB, IEEE 1394). As such, the power negotiation and management may be outside the scope of the normal operation of the bus.

Figure 9:
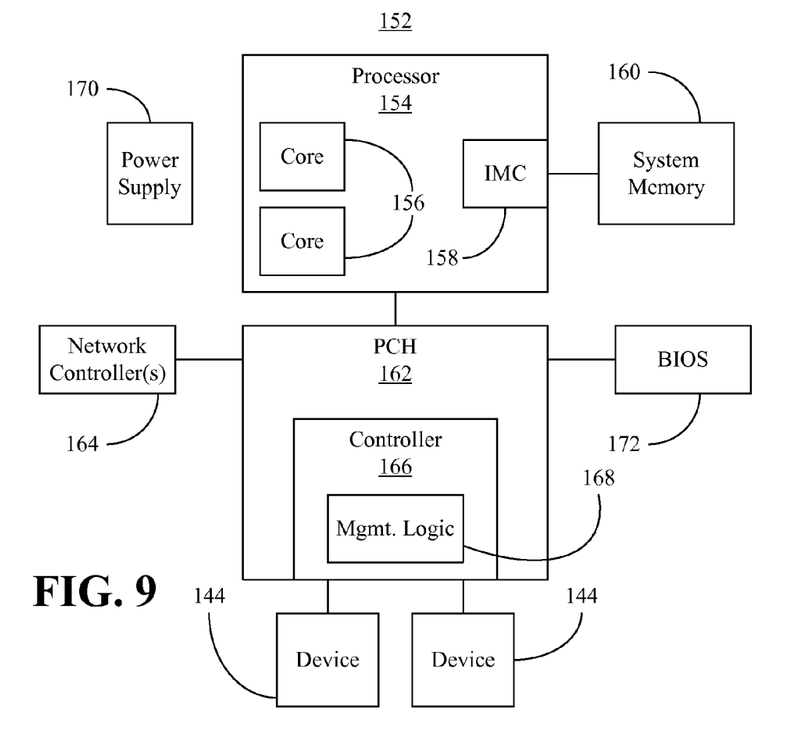
FIG. 9 is a block diagram of an example of a system according to an embodiment.

Turning now to FIG. 9, a computing system 152 is shown. The system 152 could be part of a mobile device such as a laptop, personal digital assistant (PDA), mobile Internet device (MID), wireless smart phone, media player, imaging device, etc., or any combination thereof. The system 152 could alternatively include a fixed platform such as a desktop personal computer (PC) or a server. In the illustrated example, a processor 154 includes one or more cores 156 and an integrated memory controller (IMC) 158, which provides access to system memory 160. The system memory 160 could include double data rate (DDR) synchronous dynamic random access memory (SDRAM, e.g., DDR3 SDRAM JEDEC Standard JESD79-3C, April 2008) modules. The modules of the system memory 160 may be incorporated into a single inline memory module (SIMM), dual inline memory module (DIMM), small outline DIMM (SODIMM), and so on. The processor 154 may also execute one or more drivers and an operating system (OS) such as a Microsoft Windows, Linux, or Mac (Macintosh) OS.

The illustrated processor 154 communicates with a platform controller hub (PCH) 162, also known as a Southbridge, via a bus, wherein the PCH 162 may function as an input/output (IO) module. The IMC 158/processor 154 and the PCH 162 are sometimes referred to as a chipset. The processor 154 may also be operatively connected to a network (not shown) through the PCH 162 and one or more network controllers 164. Thus, the network controllers 164 could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The PCH 162 may also be coupled to storage, which can include a hard drive (not shown), read only memory (ROM), optical disk, BIOS (basic input/output system) memory 160, flash memory (not shown), RAID (redundant array of independent disks, not shown), etc.

In addition, the PCH 162 may include internal controllers such as a serial interconnect controller 166, a Serial ATA (SATA, e.g., SATA Rev. 3.0 Specification, May 27, 2009, SATA International Organization/SATA-IO) controller (not shown), a High Definition Audio controller (not shown), etc. The illustrated serial interconnect controller 166 includes management logic 168 to manage power delivery policies of one or more devices 144 connected to a power line interface of the controller 166 based on changes in the power delivery capability of the system 152. Thus, the controller 166 could include the functionality of the controller 136 (FIG. 8), already discussed. In particular, the management logic 168 may be able to dynamically track and account for power delivery capability changes, which may be dependent on the capacity of a power supply 170 as well as the demand on the power supply from both internal platform components and the devices 144. In addition, the management logic 168 can be used to manage the power delivery policies of other system components such as the network controller 164, other internal controllers of the PCH 162, or other devices connected to those controllers. The management logic 168 could also be implemented elsewhere in the computing system 152. For example, the management logic 168 might reside in the power supply 170, within a USB port over-current device, or within an AC adaptor having no USB data lines.

Approaches described herein can therefore reduce power supply costs by matching capacity to a designed value rather than a default value based on worst case requirements of a particular bus. In addition, adjusting loads to meet the current environment can provide enhanced platform flexibility. For example, a platform can shed load to increase battery life as the battery runs down or when switching from AC to battery operation. The platform may also adjust the load in response to other platform state changes. Moreover, a number of "green" benefits may be realized such as a reduction of AC adaptors due to more power being available over IO interfaces, and minimized power regulation losses due to dynamic adjustment of power supply regulation based on the expected load. Consumer device detection can also allow the power supply to remain in deeper low power modes until normal operation is needed, and a "universal charger" usage model may reduce land fill contributions because the same charger can be used for multiple devices. Additionally, a CNI (charger not included) usage model can be implemented to further reduce cost.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    determining a power delivery capability of a system having a power line interface;
    detecting a connection of a first device to the power line interface;
    negotiating a first power delivery policy with the first device, wherein the negotiating is conducted over a first power line coupled to the power line interface;
    updating the power delivery capability of the system based on the first power delivery policy;
    detecting a connection of a second device to the power line interface;
    negotiating a second power delivery policy with the second device, wherein the negotiating is conducted over a second power line coupled to the power line interface;
    updating the power delivery capability of the system based on the second power delivery policy, wherein the first and second power delivery policies each indicate a direction of power delivery.

2. The method of claim 1, further including:
    detecting a disconnection of the second device from the power line interface; and
    updating the power delivery capability of the system based on the disconnection.

3. The method of claim 1, further including:
   detecting a change in the power delivery capability of the system, wherein the change in the power delivery capability is associated with a change in a power source of the system; and
   modifying at least one of the first and second power delivery policies if the change in the power source results in a load requirement that exceeds the power delivery capability of the system.

4. The method of claim 1, wherein negotiating at least one of the first and second power delivery policies includes:
   advertising the power delivery capability of the system over a power line;
   receiving a request from a device over the power line;
   sending an acknowledgement of the request over the power line; and
   adjusting an output associated with the power line based on the request, wherein at least one of the power delivery capability, the request and the acknowledgement is transferred over the power line concurrently with a data transfer over the data line.

5. The method of claim 1, wherein negotiating at least one of the first and second power delivery policies includes:
   receiving an advertisement over a power line, wherein the advertisement identifies a power delivery requirement;
   sending an acknowledgement of the advertisement over the power line; and
   adjusting an output associated with the power line based on the advertisement,
      wherein at least one of the power delivery requirement and the acknowledgement is to be transferred over the power line concurrently with a data transfer over the data line.

6. An apparatus comprising:
   a power line interface; and
   a controller including management logic to manage a power delivery policy of a first device connected to the power line interface based on a change in a power delivery capability of the apparatus,
      wherein the management logic is to negotiate the power delivery policy of the first device over a power line coupled to the power line interface of the apparatus.

7. The apparatus of claim 6, wherein the management logic is to:
   detect a connection of a second device to the power line interface,
   establish a power delivery policy for the second device in response the connection, and
   update the power delivery capability of the apparatus based on the power delivery policy of the second device.

8. The apparatus of claim 7, wherein the management logic is to:
   detect a disconnection of the second device from the power line interface, and
   update the power delivery capability of the apparatus based on the disconnection.

9. The apparatus of claim 6, wherein the management logic is to:
   detect the change in the power delivery capability of the apparatus, wherein the change in the power delivery capability is to be associated with a change in a power source of the apparatus, and
   modify the power delivery policy of the first device if the change in the power source results in a load requirement that exceeds the power delivery capability of the apparatus.

10. The apparatus of claim 6, wherein the management logic is to:
    advertise the power delivery capability of the apparatus over the power line,
    receive a request from the first device over the power line,
    send an acknowledgement of the request over the power line, and
    adjust an output associated with the power line based on the request, wherein at least one of the power delivery capability, the request and the acknowledgement is to be transferred over the power line concurrently with a data transfer over the data line.

11. The apparatus of claim 6, wherein the management logic is to:
    receive an advertisement from the first device over the power line, wherein the advertisement identifies a power delivery requirement,
    send an acknowledgement of the advertisement over the power line, and
    adjust an output associated with the power line based on the advertisement, wherein at least one of the power delivery requirement and the acknowledgement is to be transferred over the power line concurrently with a data transfer over the data line.

12. The apparatus of claim 6, wherein the management logic is to negotiate a power delivery direction with respect to the apparatus and the first device.

13. The apparatus of claim 6, further including a data line interface, wherein the controller has a peripheral bus interface physical layer that includes the management logic.

14. A system comprising:
    a processor; and
    an input/output module coupled to the processor, the input/output module including,
    a power line interface, and
    a controller having management logic to manage a power delivery policy of a first device connected to the power line interface based on a change in a power delivery capability of the system,
       wherein the management logic is to negotiate the power delivery policy of the first device over a power line coupled to the power line interface of the apparatus.

15. The system of claim 14, wherein the management logic is to:
    detect a connection of a second device to the power line interface,
    establish a power delivery policy for the second device in response to the connection, and
    update the power delivery capability of the system based on the power delivery policy of the second device.

16. The system of claim 15, wherein the management logic is to:
    detect a disconnection of the second device from the power line interface, and
    update the power delivery capability of the system based on the disconnection.

17. The system of claim 14, wherein the management logic is to:
    detect the change in the power delivery capability of the system, wherein the change in the power delivery capability is to be associated with a change in a power source of the apparatus, and
    modify the power delivery policy of the first device if the change in the power source results in a power delivery policy of the first device having a load requirement that exceeds the power delivery capability of the system.

18. The system of claim 15, wherein the management logic is to:
  advertise the power delivery capability of the system over the power line,
  receive a request from the first device over the power line,
  send an acknowledgement of the request over the power line, and
  adjust an output associated with the power line based on the request, wherein at least one of the power delivery capability, the request and the acknowledgement is to be transferred over the power line concurrently with a data transfer over the data line.

19. The system of claim 15, wherein the management logic is to:
  receive an advertisement from the first device over the power line, wherein the advertisement identifies a power delivery requirement,
  send an acknowledgement of the advertisement over the power line, and
  adjust an output associated with the power line based on the advertisement, wherein at least one of the power delivery requirement and the acknowledgement is to be transferred over the power line concurrently with a data transfer over the data line.

20. The system of claim 15, wherein the management logic is to negotiate a power delivery direction with respect to the system and the first device.

21. The system of claim 14, wherein the controller has a peripheral bus interface physical layer that includes the management logic.

\* \* \* \* \*